Feb. 23, 1954
A. KASSEL
2,669,894
NUT-HOLDING DEVICE
Filed April 3, 1951
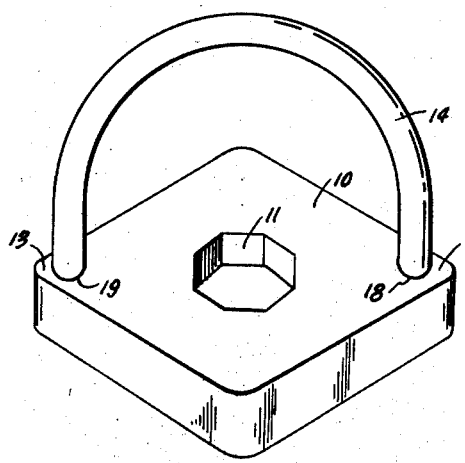
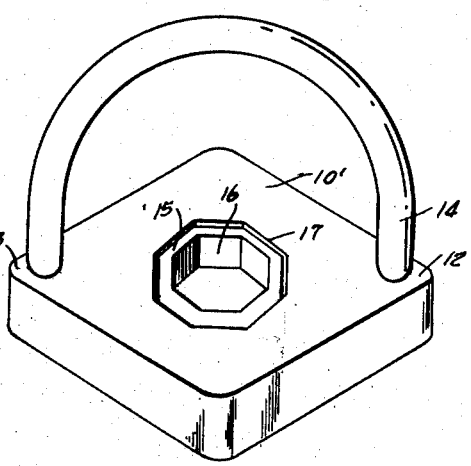
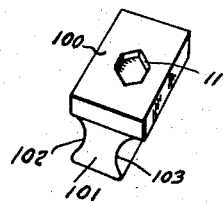
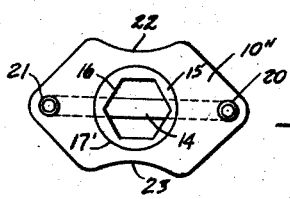
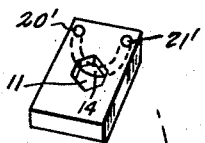
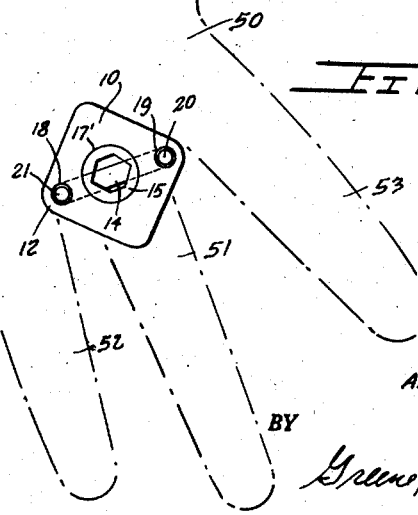
INVENTOR.
ALVIN KASSEL
BY
Greene, Pinelle & Dunn
ATTORNEYS Patented Feb. 23, 1954

2,669,894

UNITED STATES PATENT OFFICE 2,669,894

NUT-HOLDING DEVICE

Alvin Kassel, Bronx, N. Y.

Application April 3, 1951, Serial No. 218,952

1 Claim. (Cl. 81—13)

This invention relates to a nut-holding ring adapted to be used in applying and tightening nuts to bolts or screws.

Sometimes as in the assembling of airplane parts, a number of nuts have to be started and tightened onto screws or bolts to assemble the parts and in many cases it is impossible to insert a wrench or pliers or any ordinary nut-holding tool to hold the nut against turning when the bolt or screw is rotated. Often it is impossible to get much more than the hand into the space in which the nut must be held. When the fingers are used they cannot possibly hold the nut tightly and the fingers quickly become scratched and sensitive in the attempt.

An object of this invention is to provide a new tool for holding nuts which can be quickly moved to the desired spot and which does not require much, if any, more space for manipulation in a narrow space than the space required for the insertion of the flat hand.

Another object of the invention is to provide nut holding tool which can be attached to and retained by the hand while not substantially increasing the width of the hand or further limiting the size of the space into which the hand can be inserted.

These objects and others ancillary thereto are obtained by adding a holding means to a flat nut holding device in such a way that the latter is adapted to be held on a finger adjacent the palm of the hand. A very convenient way to adapt the nut holder for securing to the finger is to add a loop to the flat nut-holding device so that the combination of the loop and nut-holder forms a finger ring.

The nut-holder can be made in various shapes but in general comprises a flat piece of metal with a nut-holding opening in a central portion. The loop which forms the ring is in a plane which is substantially perpendicular to the plane of the flat piece of metal and its nut-holding opening. It is possible to form an opening in the flat metal piece which is adapted to hold nut-holding elements of various sizes but it must be remember that the flat nut-holder itself should be kept as thin as possible so as not to appreciably increase the thickness of the hand to which it is applied. Since ordinarily there are large numbers of similar nuts to be tightened it is sometimes desirable to employ a separate ring for each size of nut since in this way the rings can be made stronger with smaller thicknesses required. Various gripping surfaces or edges may be formed on the flat nut-holding portion.

The novel features characteristic of this invention are set forth with particularity in the appended claim. The invention itself, however, both as to its organization and its method of operating, together with additional objects and advantages thereof will be best understood from the following description of specific embodiments when read in connection with the accompanying drawing in which:

Figure 1 is a perspective view of one form of the device.

Figure 2 is a perspective view of a modified form of the device.

Figure 3 is a bottom view of another modified form of the device.

Figure 4 is a view illustrating how the device is employed.

Figure 5 is a perspective view of another modified form of the device.

Figure 6 is a bottom view (similar to Figure 3) of still another form of the device.

The device shown in Figure 1, comprises the flat plate 10 in which is formed the hexagonal opening 11 extending through said plate for holding a nut. A hexagonal opening is shown since this is the most usual shape of nut employed but it is obvious that the opening 11 can take any desired shape and that the size of the opening 11 is limited only by the size of the plate 10. At opposite corners 12 and 13 the ends of the loop 14 are fixed in any desired way; although the loop 14 is shown as extending to opposite corners 12 and 13, it is obvious that the loop 14 can extend from any two opposite edge portions of plate 10. In Figures 1 and 4 the ends pass through holes 18 and 19 in plate 10 and the ends 20 and 21 of the loop are swaged or riveted in the enlarged part of openings 18 and 19 at the bottom of said plate 10 (see Figure 4).

It is possible to make the device with replaceable nut-holders of different sizes as shown in Figure 2. Like numbers refer to like parts throughout the specification. Figure 2 shows a plate 10' formed with a hexagonal opening 17 into which is fitted the hexagonal insert 15 having the nut fitting opening 16. Polygonal inserts having different sizes and shapes of nut fitting openings may be supplied to fit into the opening 17, which may be made circular, as shown at 17' in Figs. 3 and 4.

The plate 10 does not need to be square as shown in Figs. 1 and 2 but can take any convenient form as long as its strength is not impaired. As shown in Fig. 3 the plate 10" may have extra cut-out portions 22, 23 at the alternate corners where the ends 20, 21 of the loop are not attached. The cut-out portions 22, 23 may be regarded as an added grip upon the plate 10".

In the device shown in Figure 5 the holder 100 is held on a grooved handle 101 adapted to be held between the fingers. Two adjacent fingers of the hand fit along grooves 102 and 103 to firmly hold the nut holder in the desired spot.

According to the modification shown in Figure 6 the ring is fitted along one edge of the device, the ends 20' and 21' of said ring showing in this bottom view. Sometimes it might be desirable to have the opening 11 nearer the palm of the hand and this device provides for such a possibility.

In application the loop 14 is slipped over a finger of the hand 50. The second finger 51 is the one most frequently used. The two adjacent fingers 52 and 53 are held against the sides of the loop 14. The plate 10 is preferably made relatively thin, for example between $\frac{1}{16}$" and $\frac{3}{8}$" so that no excessive barrier to the insertion of the hand into narrow spaces results. The device can be employed for starting the nuts on the bolts or screws as well as for holding the nut while rotating the bolts or screws. For example a nut may be placed into the opening 11 after the ring is inserted on the finger 51 and it is a simple matter to guide the hand to the proper position by sliding the fingers 51, 52 or 53 along the protruding end of a bolt or screw even though it is impossible to see said end.

It appears to be quite obvious that the invention provides a simple and effective device for holding a nut against turning when the head of a bolt or screw on which it is fitted, is turned. The device locates and retains the nut-holding orifice at a convenient place on the hand so that when one side of a nut-bolt combination is located in a narrow space it is still a simple matter to hold one end of the combination stationary with the device of the invention while rotating the other end of said combination.

I claim:

A finger-supported nut-holding tool comprising a flat and elongate plate having opposite flat surfaces, having concave side walls on opposite sides of its elongate axis and having a polygonal nut-receiving socket which extends into at least one of said flat surfaces and is located between said concave side walls; and a loop-shaped rod extending outwardly from the other of said flat surfaces and having its ends secured to said plate along said elongate axis and at points spaced from opposite wall portions of said socket, said loop-shaped rod containing a plane which lies perpendicular to said flat surfaces and which intersects said plate along said elongate axis, said loop-shaped rod cooperating with said plate to form a finger-receiving opening, whereby said tool can function as a nut holder while being worn on a finger of a human hand.

ALVIN KASSEL.

References Cited in the file of this patent

UNITED STATES PATENTS

| Number | Name | Date |
|---|---|---|
| 226,582 | Miller | Apr. 13, 1880 |
| 2,387,545 | Veney | Oct. 23, 1945 |
| 2,440,854 | Frank | May 4, 1948 |
| 2,585,641 | Faso | Feb. 12, 1952 |

FOREIGN PATENTS

| Number | Country | Date |
|---|---|---|
| 404,910 | Great Britain | Jan. 25, 1934 |
| 564,439 | Great Britain | Sept. 27, 1944 |